US012675094B2

(12) United States Patent
Aghatehrani et al.

(10) Patent No.: US 12,675,094 B2
(45) Date of Patent: Jul. 7, 2026

(54) ASSESSING, MONITORING, AND/OR CONTROLLING HYDROGEN-PRODUCTION INSTALLATIONS

(71) Applicant: Ohmium International, Inc., Newark, CA (US)

(72) Inventors: Rasool Aghatehrani, Redwood City, CA (US); Bruce Zahedivach, Half Moon Bay, CA (US); Arne Ballantine, Incline Village, NV (US); Chockkalingam Karuppaiah, Fremont, CA (US)

(73) Assignee: Ohmium International, Inc., Newark, CA (US)

( * ) Notice: Subject to any disclaimer, the term of this patent is extended or adjusted under 35 U.S.C. 154(b) by 488 days.

(21) Appl. No.: 18/194,150

(22) Filed: Mar. 31, 2023

(65) Prior Publication Data

US 2023/0315054 A1 Oct. 5, 2023

Related U.S. Application Data

(60) Provisional application No. 63/354,924, filed on Jun. 23, 2022, provisional application No. 63/326,176, filed on Mar. 31, 2022.

(51) Int. Cl.
G05B 19/4155 (2006.01)
(52) U.S. Cl.
CPC .................... G05B 19/4155 (2013.01); *G05B 2219/42056* (2013.01)
(58) Field of Classification Search
None
See application file for complete search history.

(56) References Cited

U.S. PATENT DOCUMENTS

| 6,036,827 A | 3/2000 | Andrews et al. |
| 8,669,499 B2 | 3/2014 | Conrad |

(Continued)

FOREIGN PATENT DOCUMENTS

| CN | 113793649 A | * 12/2021 | ............. G16C 20/90 |
| EP | 3517653 A1 | 7/2019 | |

(Continued)

OTHER PUBLICATIONS

PCT Application No. PCT/US2023/017193 International Search Report and Written Opinion dated Jul. 11, 2023.

(Continued)

*Primary Examiner* — David Earl Ogg
(74) *Attorney, Agent, or Firm* — Polsinelli LLP

(57) ABSTRACT

Systems and techniques for monitoring, assessing, and/or controlling hydrogen production are described. For instance, a system for monitoring, assessing, and/or controlling hydrogen production may include: a plurality of electrolyzers; and a controller configured to: obtain raw data indicative of respective operations of respective electrolyzers of the plurality of electrolyzers over a period of time; obtain command data indicative of one or more commands provided to the plurality of electrolyzers over the period of time; obtain event data indicative of one or more events related to the plurality electrolyzers that occurred during the period of time; generate state data based on the raw data, the command data, and the event data, the state data comprising a respective state of each electrolyzer of the plurality of electrolyzers for each of a number of discrete time periods of the period of time; and perform one or more operations responsive to the state data.

18 Claims, 6 Drawing Sheets

(56) References Cited

U.S. PATENT DOCUMENTS

| | | | | |
|---|---|---|---|---|
| 2004/0199294 A1* | 10/2004 | Fairlie | .................. | H01M 8/0612 |
| | | | | 700/266 |
| 2005/0012638 A1* | 1/2005 | Barbir | .................... | G08C 19/00 |
| | | | | 340/870.01 |
| 2008/0127646 A1 | 6/2008 | Doland | | |
| 2013/0168236 A1* | 7/2013 | Zadeh | ..................... | C25B 15/02 |
| | | | | 204/229.2 |
| 2019/0249319 A1* | 8/2019 | Joos | .......................... | C25B 9/70 |
| 2021/0399575 A1 | 12/2021 | Nagino | | |
| 2022/0065162 A1* | 3/2022 | Hunt | ..................... | H02J 15/008 |

FOREIGN PATENT DOCUMENTS

| | | | |
|---|---|---|---|
| EP | 3950575 | A1 | 2/2022 |
| EP | 4500443 | | 5/2025 |
| WO | 2018236649 | A1 | 12/2018 |
| WO | WO 2023/192637 | | 10/2023 |

OTHER PUBLICATIONS

PCT Application No. PCT/US2023/017193, International Preliminary Report on Patentability dated Oct. 10, 2024.
EP Application No. 23781903.2, Supplementary Partial Search Report dated Mar. 3, 2026.

* cited by examiner

500

OBTAIN RAW DATA INDICATIVE OF RESPECTIVE OPERATIONS OF RESPECTIVE ELECTROLYZERS OF A PLURALITY OF ELECTROLYZERS OF A HYDROGEN-PRODUCTION INSTALLATION OVER A PERIOD OF TIME 502

OBTAIN COMMAND DATA INDICATIVE OF ONE OR MORE COMMANDS PROVIDED TO THE PLURALITY OF ELECTROLYZERS OVER THE PERIOD OF TIME 504

OBTAIN EVENT DATA INDICATIVE OF ONE OR MORE EVENTS RELATED TO THE PLURALITY ELECTROLYZERS THAT OCCURRED DURING THE PERIOD OF TIME 506

GENERATE STATE DATA BASED ON THE RAW DATA, THE COMMAND DATA, AND THE EVENT DATA, THE STATE DATA COMPRISING A RESPECTIVE STATE OF EACH ELECTROLYZER OF THE PLURALITY OF ELECTROLYZERS FOR EACH OF A NUMBER OF DISCRETE TIME PERIODS OF THE PERIOD OF TIME 508

PERFORM ONE OR MORE OPERATIONS RESPONSIVE TO THE STATE DATA 510

FIG. 5

ASSESSING, MONITORING, AND/OR CONTROLLING HYDROGEN-PRODUCTION INSTALLATIONS

CROSS-REFERENCE TO RELATED APPLICATIONS

This application claims priority to U.S. Provisional Application No. 63/326,176 entitled "Digital platform: Comprehensive Data Acquisition, Monitoring and Control System, and Enterprise Software Application Suite", filed Mar. 31, 2022, and to U.S. Provisional Application No. 63/354,924 entitled "COMPREHENSIVE SYSTEM FOR DATA ACQUISITION, MONITOR, AND CONTROL OF A HYDROGEN PLANT", filed Jun. 23, 2022, the entire contents of which are incorporated by reference herein.

FIELD

The present disclosure generally relates to assessing, monitoring, and/or controlling hydrogen-production installations. For example, some embodiments of the present disclosure include systems and techniques for assessing, monitoring, and/or controlling operations of a hydrogen-production installation to enable the hydrogen-production installation to operate according to specific performance guarantee terms.

BACKGROUND

A hydrogen-production installation may include a number of electrolyzers. An electrolyzer is a device that may use electrical power, in the form of direct electrical current, to drive a chemical reaction. In the present disclosure, the term "electrolyzer" may refer to a device that may produce hydrogen by applying a direct electrical current to water to separate hydrogen from oxygen. The electrolyzer may output the hydrogen to a downstream consumer.

BRIEF SUMMARY

The following presents a simplified summary relating to one or more embodiments disclosed herein. Thus, the following summary should not be considered an extensive overview relating to all contemplated embodiments, nor should the following summary be considered to identify key or critical elements relating to all contemplated embodiments or to delineate the scope associated with any particular embodiment. Accordingly, the following summary presents certain concepts relating to one or more embodiments relating to the mechanisms disclosed herein in a simplified form to precede the detailed description presented below.

Systems and techniques are described for monitoring, assessing, and/or controlling hydrogen production. According to at least one example, a system for monitoring, assessing, and/or controlling hydrogen production is provided. The system including: a plurality of electrolyzers; and a controller configured to: obtain raw data indicative of respective operations of respective electrolyzers of the plurality of electrolyzers over a period of time; obtain command data indicative of one or more commands provided to the plurality of electrolyzers over the period of time; obtain event data indicative of one or more events related to the plurality electrolyzers that occurred during the period of time; generate state data based on the raw data, the command data, and the event data, the state data comprising a respective state of each electrolyzer of the plurality of electrolyzers for each of a number of discrete time periods of the period of time; and perform one or more operations responsive to the state data.

In another example, a method is provided for monitoring, assessing, and/or controlling hydrogen production. The method includes: obtaining raw data indicative of respective operations of respective electrolyzers of a plurality of electrolyzers of a hydrogen-production installation over a period of time; obtaining command data indicative of one or more commands provided to the plurality of electrolyzers over the period of time; obtaining event data indicative of one or more events related to the plurality electrolyzers that occurred during the period of time; generating state data based on the raw data, the command data, and the event data, the state data comprising a respective state of each electrolyzer of the plurality of electrolyzers for each of a number of discrete time periods of the period of time; and performing one or more operations responsive to the state data.

In another example, an apparatus for monitoring, assessing, and/or controlling hydrogen production is provided that includes at least one memory and at least one processor (e.g., configured in circuitry) coupled to the at least one memory. The at least one processor configured to: obtain raw data indicative of respective operations of respective electrolyzers of a plurality of electrolyzers of a hydrogen-production installation over a period of time; obtain command data indicative of one or more commands provided to the plurality of electrolyzers over the period of time; obtain event data indicative of one or more events related to the plurality electrolyzers that occurred during the period of time; generate state data based on the raw data, the command data, and the event data, the state data comprising a respective state of each electrolyzer of the plurality of electrolyzers for each of a number of discrete time periods of the period of time; and perform one or more operations responsive to the state data.

In another example, a non-transitory computer-readable medium is provided that has stored thereon instructions that, when executed by one or more processors, cause the one or more processors to: obtain raw data indicative of respective operations of respective electrolyzers of a plurality of electrolyzers of a hydrogen-production installation over a period of time; obtain command data indicative of one or more commands provided to the plurality of electrolyzers over the period of time; obtain event data indicative of one or more events related to the plurality electrolyzers that occurred during the period of time; generate state data based on the raw data, the command data, and the event data, the state data comprising a respective state of each electrolyzer of the plurality of electrolyzers for each of a number of discrete time periods of the period of time; and perform one or more operations responsive to the state data.

In another example, an apparatus for monitoring, assessing, and/or controlling hydrogen production is provided. The apparatus includes: means for obtaining raw data indicative of respective operations of respective electrolyzers of a plurality of electrolyzers of a hydrogen-production installation over a period of time; means for obtaining command data indicative of one or more commands provided to the plurality of electrolyzers over the period of time; means for obtaining event data indicative of one or more events related to the plurality electrolyzers that occurred during the period of time; means for generating state data based on the raw data, the command data, and the event data, the state data comprising a respective state of each electrolyzer of the plurality of electrolyzers for each of a number of discrete time periods of the period of time; and means for performing one or more operations responsive to the state data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 5 is a flow diagram illustrating a process 500 for monitoring, assessing, and/or controlling operations of a hydrogen-production installation, in accordance with various embodiments of the present disclosure.

DETAILED DESCRIPTION

Figure 1:
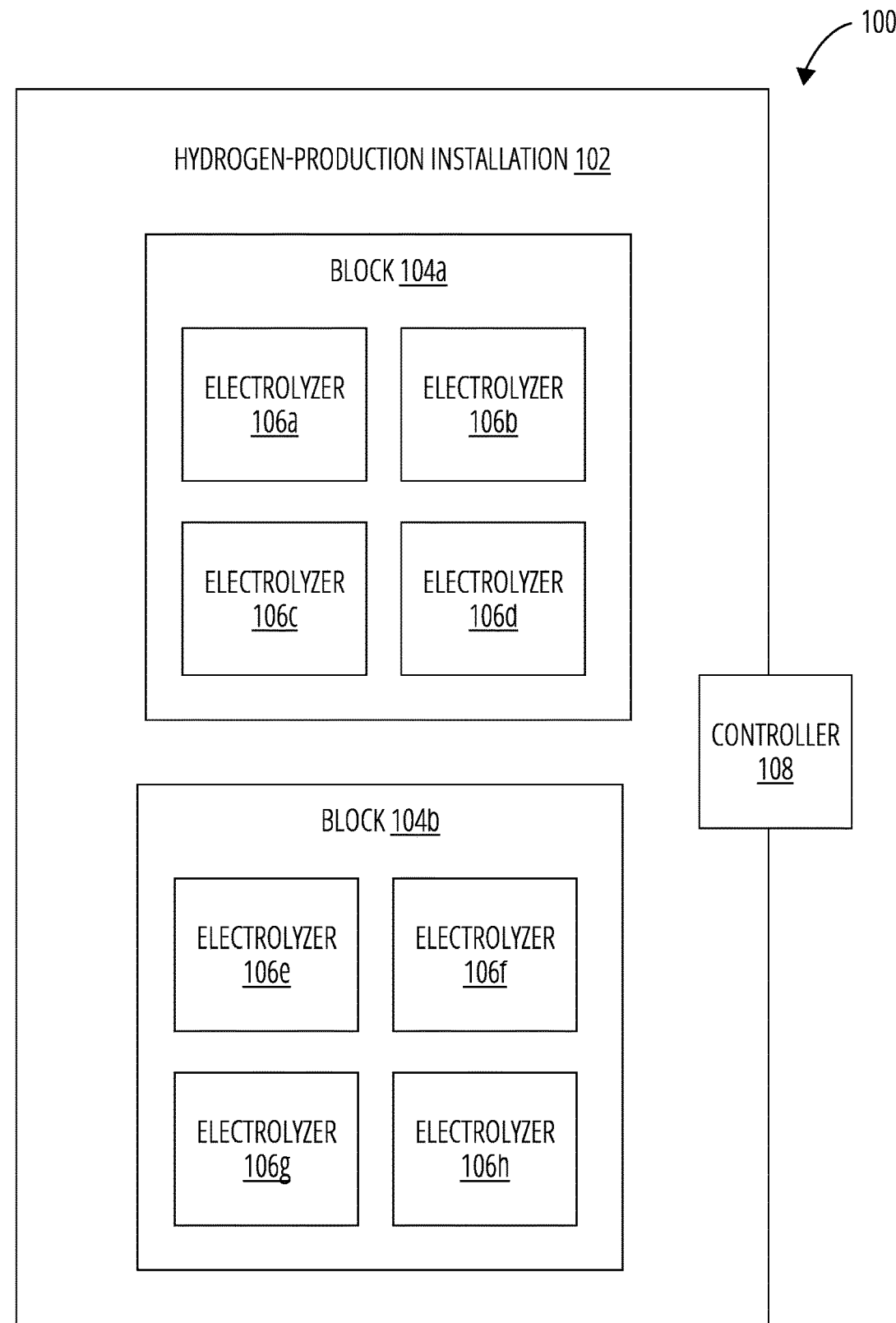
FIG. 1 is a diagram illustrating a system including a controller for monitoring, assessing, and/or controlling operation of a hydrogen-production installation, according to various embodiments of the present disclosure.

Certain embodiments of this disclosure are provided below. Some of these embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage, or mode of operation. Decarbonization, net-zero emission, renewable-energy generation, and alternative fuels are drivers and enablers for energy transformation. Clean hydrogen is part of new trends to support built out of massive new infrastructure that needs to be integrated with the existing assets and services and evolve in most economical way. "Clean hydrogen" refers to production of hydrogen using water electrolysis technology (e.g., electrolyzers). If the power source is from renewable sources, the hydrogen may be referred to as "Green hydrogen."

To support this initiative, new industrial design and multidisciplinary systems engineering are required. Companion to hardware and process, software applications are needed to integrate the overall solution to provide "asset health and performance assessment" with control and monitoring capabilities to support long-term financial and contractual commitments for all parties involved. This requires a new way of thinking to bring sensor data, operational rules, and performance indicators together as an intelligent automated system with the appropriate user experience.

Hydrogen-production installations rely on external resources such as electric power and water to produce hydrogen gas. All three items need to meet the required 'specifications' under the plant's 'dynamic operating conditions' for an optimal long-term operation and performance. Real-time monitoring and control and reporting (performance, operation, compliance) are used as means to manage availability, safety, reliability, compliance—with all, having business financial implications. In many cases, produced hydrogen has co-located downstream usage, and its production interruptions may have cascade effects on the overall industrial and commercial operation (and financial outcomes).

Systems, apparatuses, methods (also referred to as processes), and computer-readable media (collectively referred to herein as "systems and techniques") are described herein for monitoring, assessing, and/or controlling operations of a hydrogen-production installation. The systems and techniques described herein may receive raw data (including plant-level and equipment-level data), simulated data, command data, and/or event data, all related to a hydrogen-production installation over a period of time. The systems and techniques may monitor, assess, and/or control operations of the hydrogen-production installation based on the received data. For example, based on the received data, the systems and techniques may determine asset-level 'state' data including an availability state of each electrolyzer of the hydrogen-production installation for discrete time periods of the period of time. Based on the asset-level state data the systems and techniques may determine key performance indicators (KPIs) for the hydrogen-production installation. For example, the systems and techniques may determine whether the hydrogen-production installation met or exceeded production expectations at required specification. Further, if the hydrogen-production installation did not meet expectations, the systems and techniques may determine, with specificity, why the hydrogen-production installation did not meet the expectations. Further, the systems and techniques may generate insights in forms of reports, alerts, and/or recommendations to improve performance of the hydrogen-production installation. Additionally, or alternatively, the systems and techniques may generate invoices based, at least in part, on compliance to contractual terms for operation of the hydrogen-production installation. The invoices may include information regarding any shortfalls (e.g., amounts by which expectations were not met) and explanations and/or financial consequences for the shortfalls based on the state data. Additionally, or alternatively, the systems and techniques may adjust operation of one or more electrolyzers of the hydrogen-production installation to improve operation of the hydrogen-production installation.

A clean hydrogen ($H_2$) market may develop rapidly in coming years and a key enabler may include a Hydrogen Purchase Agreement (HPA) that may create a commercial contractual framework for planning, financing, building, and operating new hydrogen-production installations. That is in association with the required infrastructure such as input renewable power, input water, $H_2$ distribution & delivery network, $H_2$ downstream application. HPA may have risk allocation provisions to consider failures during operation for out-of-specification input power and water or equipment unavailability or equipment partial capacity. Bankability of hydrogen project development may rely on predictable revenue streams.

For hydrogen market to grow rapidly, development of HPA with dependable & credible processes across the back-to-back contracts may be important. 'Data' and 'methods' with proven track record may be used to assign or assume risks and/or financial liability. Such a method could be asset-level 'availability' models or 'Performance Guarantee' models that would give insights about product design, project installation, operations and maintenance, asset health, and performance of a hydrogen-production installation, to name a few. Through such insight, risk can be assigned to the right party. The HPA terms may become enforceable for such encountered risks.

A hydrogen-production installation architecture may be based on 3 levels of asset hierarchy including: 1) electrolyzer 2) standard generation block, and 3) entire plant. The systems and techniques may consider a modular and interlocking plant design architecture. The systems and techniques may use an availability algorithm that may assign availability states at every level of asset hierarchy for specific duration time slots (e.g., per minute). The availability algorithm discovery assignment may incorporate data from multiple sources including $H_2$ plant time-series data, field services event logs, device alarms, and weather data. The availability algorithm may consider the plant's as-built design data models, Electrolyzer stack and power electronics performance models, and site weather historical & forecast data. The availability algorithm may consider the plant's operating condition in terms of de-rate control commands.

Relating to 'Performance Guarantee' (PG), the availability algorithm may play a role. PG contract terms for each project individually maybe used in conjunction with the configuration templates to support per-project PG assessment and reporting. PG key performance indicators (KPIs) may be determined based on user selectable duration (last hour, today, yesterday, last week, last month, last quarter, or last year) for each asset level of electrolyzer, standard block, and/or plant for each project. The availability algorithm may enable generation of reports with high precision PG status at every asset level with root cause and supporting data. This assumes that the undelaying data has high integrity and has no major data gaps.

HPAs may be complex. Clean/Green $H_2$ plants may have many back-to-back contracts. There may be contractual dependencies in terms of power purchase agreements, water contracts, $H_2$ transport and distribution, and demand-side $H_2$ applications. There may be expectations for $H_2$ plant production, due to co-location to synchronize operation with downstream application demand profile. For Green $H_2$ plants, the intermittencies of the renewable power sources coupled with downstream demand-side requirements may lead to $H_2$ plant operating conditions that are quite dynamic. Systems and techniques also need to consider the geolocation and seasonable variability for weather conditions for the $H_2$ production site. The situation may become even more complex for advanced deployment models when large $H_2$ plants are supporting ancillary services with grid interconnections.

$H_2$ plant availability and Performance Guarantee methods & models may support HPA and equivalent contractual terms accurately given various conditions.

Various embodiments of the application will be described with respect to the figures below.

FIG. 1 is a diagram illustrating a system 100 including a controller 108 for monitoring, assessing, and/or controlling operation of a hydrogen-production installation 102 according to various embodiments of the present disclosure. Hydrogen-production installations may be built in different production capacities designed to serve different downstream applications. Hydrogen-production installations could be sized from sub-1 MegaWatt (MW) to multi-Gigawatt (GW). Electrolyzers may be connected in series or in parallel to support plant-level design requirements. Systems and techniques may monitor, assess, and/or control operations (e.g., hydrogen $H_2$ production) at a Electrolyzer level, a standard block level, and/or a plant level.

Hydrogen-production installation 102 includes electrolyzer 106a, electrolyzer 106b, electrolyzer 106c, electrolyzer 106d, electrolyzer 106e, electrolyzer 106f, electrolyzer 106g, and electrolyzer 106h (which may be referred to collectively as electrolyzers 106). Electrolyzers 106 include eight electrolyzers as an example. Other hydrogen-production installations may include any number of electrolyzers.

Electrolyzers 106 are grouped into block 104a and block 104b (which may be referred to collectively as blocks 104), with four of electrolyzers 106 in block 104a and four of electrolyzers 106 in block 104b. Electrolyzers 106 may be grouped into blocks 104 according to any suitable criteria. For example, blocks 104 may be based on location and may share common instrumentations. For example, electrolyzer 106a, electrolyzer 106b, electrolyzer 106c and electrolyzer 106d may be located close to each other and electrolyzer 106e, electrolyzer 106f, electrolyzer 106g, and electrolyzer 106h may be located close to each other (and/or distant from electrolyzer 106a, electrolyzer 106b, electrolyzer 106c, and electrolyzer 106d). Hydrogen-production installation 102 includes two blocks as an example. Other hydrogen-production installations may include any number of blocks. Blocks 104 include four electrolyzers per block as an example. Other blocks may include any number of electrolyzers.

As illustrated in FIG. 1, hydrogen-production installation 102 includes a number of individual electrolyzers 106. Electrolyzers 106 are grouped into blocks 104. Controller 108 may monitor, assess, and/or control operation at an electrolyzer unit-level (e.g., assessing, monitoring, and/or controlling each electrolyzers 106 individually). Additionally, or alternatively, controller 108 may monitor, assess, and/or control operation at a block-level (e.g., monitoring, assessing, and/or controlling operation each of blocks 104). Additionally, or alternatively, controller 108 may monitor, assess, and/or control operation at a plant-level (e.g., monitoring, assessing, and/or controlling operation of all of hydrogen-production installation 102 collectively).

Controller 108 may monitor, assess, and/or control operations of electrolyzers 106 of hydrogen-production installation 102. In some cases, controller 108 may be included in hydrogen-production installation 102. In some cases, controller 108 may be remote from hydrogen-production installation 102 and may receive data from hydrogen-production installation 102 and/or provide control data to hydrogen-production installation 102. In some cases, controller 108 may be implemented in a cloud and/or as a service. For example, due to the industrial nature of the hydrogen production, it may be desirable to perform relatively little computation and/or execution of run-time algorithms at hydrogen-production installation 102 and to push the majority of such functions to the Cloud (e.g., to processors implementing controller 108 operating in the Cloud). For example, Industrial Internet of Things (IIoT) concepts may be applied to hydrogen-production installation 102 and controller 108 and to the relationship therebetween. For example, there may be sensors (instrumentations) at hydrogen-production installation 102. The sensors may provide connectivity to the Cloud (e.g., to processors implementing controller 108 in the Cloud) and may, over secure connections, push data to the Cloud (e.g., to processors implementing controller 108 in the Cloud). Controller 108 (which may be implemented in the Cloud) may perform various operations described herein based on the data from the sensors. The cost of implementation, operation, and ongoing change management may be reduced if software upgrades happen regularly in Cloud (rather than in thousands of distributed industrial sites).

One key metric that controller 108 may monitor is asset-level availability. In the present disclosure, the term "availability"—may refer to operation of one or more electrolyzers. Availability may be represented as a fraction of a specified capacity. For example, electrolyzer 106*a* may have a specified capacity indicating that, at full operational capacity, electrolyzer 106*a* is capable of consuming 300 kilowatts (kW) and producing 6 kilograms (kg) of $H_2$ per hour. If electrolyzer 106*a* is operating at 100% availability, it may be consuming 300 kW and producing 6 kg of $H_2$ per hour. If electrolyzer 106*a* is operating at 50% availability, it may be consuming 150 kW and producing 3 kg of $H_2$ per hour.

The availability of an electrolyzer at a given time may be based at least in part on design specifications, asset-health, operations and maintenance practices, and/or operating conditions. For example, electrolyzer 106*a* may receive insufficient resources (e.g., water and/or power) to operate at full capacity. As another example, electrolyzer 106*a* may not be able to produce $H_2$ at full capacity based on a demand-side ability to receive $H_2$, for example, a compressor or pipeline may not be able to receive $H_2$ at the rate at which electrolyzer 106*a* can produce $H_2$. As another example, electrolyzer 106*a* may receive operation instructions directing electrolyzer 106*a* to operate at below full capacity. As another example, based on an ambient temperature, electrolyzer 106*a* may operate at below full capacity (e.g., based on an operational guideline).

Controller 108 may determine availability at a unit level (e.g., determining the availability of each of electrolyzers 106 independently). Further, controller 108 may determine availability at a block level (e.g., determining the availability of all electrolyzers of block 104*a* and separately determining the availability of all electrolyzers of block 104*b*). For example, controller 108 may determine the availability of block 104*a* by determining the availability of electrolyzer 106*a*, electrolyzer 106*b*, electrolyzer 106*c* and electrolyzer 106*d* and controller 108 may determine the availability of block 104*b* by determining the availability of electrolyzer 106*e*, electrolyzer 106*f*, electrolyzer 106*g*, and electrolyzer 106*h*. Further, controller 108 may determine availability at a highest level (e.g., determining the availability of all electrolyzers of the hydrogen-production installation 102). For example, the systems and techniques may determine the availability of hydrogen-production installation 102 by determining the availability of all of electrolyzers 106.

$H_2$ production of hydrogen-production installation 102 may be based on the availability of electrolyzers 106. Revenues of hydrogen-production installation 102 may be based on the $H_2$ production of hydrogen-production installation 102. Thus, availability may be a key metric by which to assess and/or control hydrogen-production installation 102.

In some cases, an entity may agree (e.g., through a service agreement, e.g., a hydrogen purchase agreement (HPA)) to produce a certain amount of $H_2$ over a period of time. Additionally, or alternatively, the entity may agree to consume a certain amount of power to produce $H_2$ over the period of time (e.g., based on a correspondence between power consumed and $H_2$ produced). For example, the entity may operate eight electrolyzers 106 (each of which, in this example, may be capable of generating 6 kg/h and consuming 300 kW per hour when operating at full capacity). The entity may agree to produce 17,280 kg $H_2$ per month (e.g., 8 electrolyzers*6 kg $H_2$ per hour*24 hours/day*30 days/month*50% assumed availability).

In order to determine how much $H_2$ to agree to produce, the entity may determine several capacity or availability metrics. The entity may start with a nameplate capacity (which may alternatively be referred to as a rated capacity, a nominal capacity, or an installed capacity) of an electrolyzer. The nameplate capacity may be a maximum production capacity of the electrolyzer under ideal conditions. If the hydrogen-production installation includes different electrolyzers, each of the electrolyzers may have its own nameplate capacity.

The entity may determine an expected capacity based on assumptions regarding resources. For example, the entity may determine the expected capacity to be the nameplate capacity reduced based on assumptions regarding resources. For example, if the electrolyzer is to be powered by solar power (e.g., to produce "green hydrogen") the entity may assume that the electrolyzer will operate at one-third of nameplate capacity based on assumptions regarding the availability of solar power over the course of a day or year.

Further, the entity may determine an adjusted capacity based on operational limits of the electrolyzer and/or based on environmental assumptions. For example, the electrolyzer may operate at a reduced rate based on temperature considerations (e.g., to prevent the electrolyzer, or power electronics associated with the electrolyzer, from overheating).

Further, the entity may determine an operation capacity based on assumptions regarding operations of the electrolyzer. For example, electrolyzers may be provided with commands limiting the production of the electrolyzers. For example, the entity may need to service the electrolyzer and may issue a command to take the electrolyzer out of service for a set period of time during the month to service the electrolyzer. Additionally, or alternatively, a consumer of the $H_2$ may be limited in terms of how much (or at what rate) the consumer can receive $H_2$. Therefore, the consumer may issue a command limiting production of the electrolyzer. Additionally, or alternatively, the consumer may only want a certain amount or $H_2$ or may want $H_2$ at a certain rate and may therefore command the electrolyzer to limit production.

The entity may determine how much $H_2$ to agree to produce based on one or more of the nameplate capacity, the expected capacity, the adjusted capacity, and the operation capacity. In some cases, the entity may guarantee performance, e.g., agree to produce an amount of $H_2$ over a period of time. In some cases, such agreements may include contingencies, e.g., the agreed upon amount may be subject to demand of the consumer and/or availability of the consumer to receive $H_2$.

It may be valuable, whether there is a performance guarantee or not, to be able to determine states of electrolyzers for discrete time periods of the period of time. Thus, controller 108 may determine state data indicative of states of each of electrolyzers 106. The states of the electrolyzers may include availability of the electrolyzer and, in some cases, causes for the availability. For example, state data of an electrolyzer may indicate during which time periods the electrolyzer was operating at full capacity and during which time periods the electrolyzer was operating below full capacity and reasons why the electrolyzer was operating below full capacity.

For example, the state data may indicate that over the course a month, during certain time periods, electrolyzer 106a was commanded by a consumer to operate at less than full capacity (e.g., based on limited ability to receive or consume $H_2$). Additionally, the state data may indicate that during certain time periods electrolyzer 106a was provided with insufficient resources and that during certain other time periods electrolyzer 106a was out of service due to mechanical failure. There may be exclusions in the service agreement for time periods when an electrolyzer is commanded to operate at less than full capacity and/or for time periods when an electrolyzer is provided with insufficient resources. The entity may be excused from a portion of the agreed upon amount of $H_2$ to produce during the month based on such exclusions. However, there may be no such exclusion for mechanical failures. Therefore, it may be valuable to understand the availability of electrolyzers of a hydrogen-production installation and causes associated with the availabilities on a discrete-time basis. According to some embodiments, controller 108 may generate reports and/or invoices based on the state data.

Further, state data may aid in determining reasons why electrolyzers are operating at below full capacity which may aid in improving $H_2$ production. For example, state data may indicate that electrolyzer 106b is consistently operating below capacity. According to some embodiments, the systems and techniques may generate a recommendation that electrolyzer 106b be serviced.

Further, according to some embodiments, controller 108 may adjust operation of one or more of electrolyzers 106 based on the state data. For example, the state data may indicate a trend regarding how block 104b performs during a particular time of day. Controller 108 may adjust operational parameters of the electrolyzers of block 104b based on the state data. Additionally, or alternatively, the state data may indicate a trend regarding resource provision and/or $H_2$ consumption. Controller 108 may adjust operational parameters of one or more of electrolyzers 106 responsive to the state data.

Figure 2:
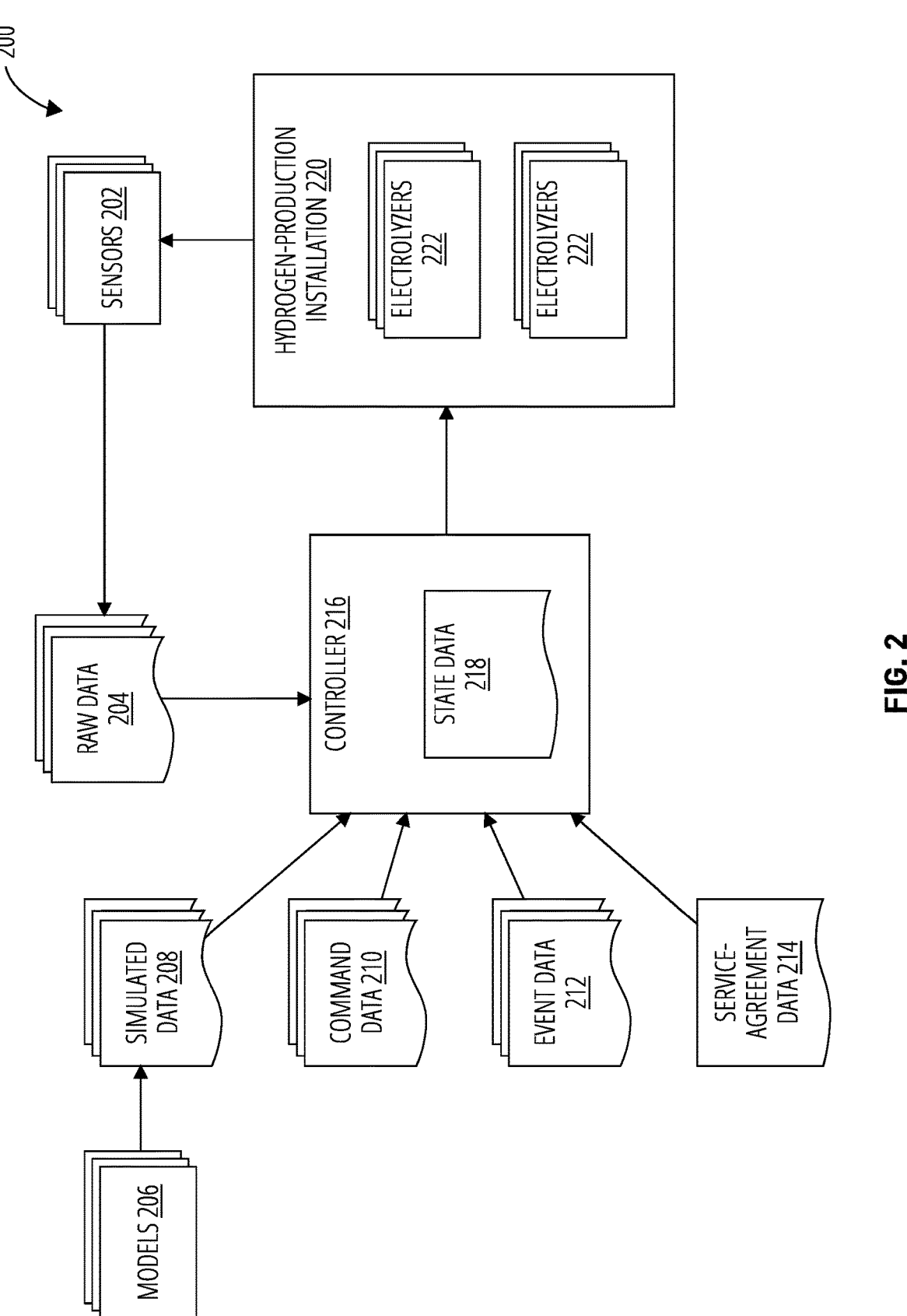
FIG. 2 is a diagram illustrating an example system including a controller for monitoring, assessing, and/or controlling operation of hydrogen-production installation, according to various embodiments of the present disclosure.

FIG. 2 is a diagram illustrating an example system 200 including a controller 216 for monitoring, assessing, and/or controlling operation of hydrogen-production installation 220 according to various embodiments of the present disclosure. Controller 216 may receive various data from various sources and may perform operations responsive to the received data.

Sensors 202 may generate raw data 204 and provide raw data 204 to controller 216. Raw data 204 may be indicative of respective operations of respective electrolyzers 222 of hydrogen-production installation 220 over a period of time. Raw data 204 may be timestamped. Raw data 204 may be high resolution (e.g., including data points for seconds, or fractions of seconds). Raw data 204 may represent change over the period time.

Sensors 202 may include sensors measuring electrical power consumed by individual electrolyzers of electrolyzers 222 (e.g., voltage meters or current meters), sensors measuring water consumed by individual electrolyzers (e.g., flow meters), sensors measuring $H_2$ produced by individual electrolyzers (e.g., $H_2$ flow meters), sensors measuring temperatures of, or at, individual electrolyzers, and/or other sensors measuring operations of individual electrolyzers. Other sensors may include $H_2$ pressure sensor or $H_2$ dew point meter.

Additionally, raw data 204 may include ambient weather data indicative of current, historical, and/or upcoming weather conditions of the hydrogen-production installation or event data related to scheduled maintenance from site power and Internet service providers.

Simulated data 208 may be generated based on models 206. In some cases, simulated data 208 may be provided to controller 216. In some cases, controller 216 may include models 206 and may generate simulated data 208. Models 206 may include as-built data models, operational models, and/or performance models of individual electrolyzers of electrolyzers 222, blocks of electrolyzers of electrolyzers 222, and/or the whole of hydrogen-production installation 220. The as-built data models may represent equipment, associations, and/or properties of the individual electrolyzers, the blocks, and/or the whole of hydrogen-production installation 220. The as-built data models may include a digital twin of the actual individual electrolyzers, the actual blocks, and/or the whole of the actual hydrogen-production installation 220. The operational models may include guidelines, codes, and/or best practices describing rules for operation of the individual electrolyzers, the blocks, and/or the whole of hydrogen-production installation 220. The performance models may include flow rates, quality specifications, conversion efficiencies, etc. Models 206 may be used to generate simulated data 208, which may include predictions regarding operation of the individual electrolyzers, the blocks, and/or the whole of hydrogen-production installation 220 based on given conditions, commands, and/or events.

Models 206 may also include models simulating environmental conditions (e.g., weather models). The environmental models may include models representative of extreme weather conditions and/or natural disasters. Models 206 may include models simulating resource conditions (e.g., models of resource providers), demand conditions (e.g., models of consumers of $H_2$), and/or production schedules.

Command data 210 may be indicative of one or more commands provided to one or more of electrolyzers 222 over the period of time. Command data 210 may include commands received by the individual electrolyzers, the blocks, and/or the whole of hydrogen-production installation 220. Command data 210 may be timestamped. Command data 210 may be indicative of commands from an operator of the hydrogen-production installation, a consumer capable of providing commands for the hydrogen-production installation, and/or a maintainer of the hydrogen-production installation.

Event data 212 may be indicative of one or more events related to electrolyzers 222 that occurred during the period of time. Event data 212 may be indicative of alarm data and/or field-service events (e.g., based on field-service logs). Event data 212 may be timestamped, or event data 212 may include a start time and an end time (e.g., representing the start and end of an associated event).

Service-agreement data 214 may include data representative of contractual/financial models (e.g., performance guarantees, availability, penalties, expected production, exclusions, terms, and conditions, etc.)

Controller 216 may determine state data 218 based on any or all of raw data 204, simulated data 208, command data 210, event data 212, and/or service-agreement data 214. State data 218 may include a respective state of each electrolyzer of electrolyzers 222 for each of a number of discrete time periods of the period of time. For example, for each electrolyzer of electrolyzers 222, state data 218 may include a state for each discrete time period. The discrete time periods may be, for example, a number of minutes in duration or a number of seconds in duration, e.g., one minute, five minutes, ten minutes, one second, ten seconds, or thirty seconds. State data 218 may include information indicating when each electrolyzer of electrolyzers 222 was fully available, partially available, or unavailable, throughout the period of time. Further, state data 218 may include information regarding why each electrolyzer of electrolyzers 222 was in the state that it was in. For example, for a discrete time period in which an electrolyzer of electrolyzers 222 is unavailable, state data 218 may include information regarding why the electrolyzer was unavailable. For example, state data 218 may include indications that during a certain number of discrete time periods an electrolyzer of electrolyzers 222 was unavailable due to a shortage of power or a shortage of water. Further, state data 218 may include indications that during another certain number of discrete time periods the electrolyzer of electrolyzers 222 was unavailable due to a downstream inability to accept hydrogen. Further state data 218 may include indications that the electrolyzer was unavailable because it was undergoing routine maintenance. Generating state data 218 may include monitoring operations of hydrogen-production installation 220.

In some cases, controller 216 may be included in hydrogen-production installation (e.g., hydrogen-production installation 102 of FIG. 1). In some cases, controller 216 may be remote from the hydrogen-production installation and may receive data from the hydrogen-production installation and/or provide control data to hydrogen-production installation. In some cases, controller 216 may be implemented in a cloud and/or as a service.

Controller 216 may make state data 218 available at any time, e.g., for live monitoring and/or assessment. For example, an operator may be able to view state data 218 live, while raw data 204 is coming in. Thus, the operator may be enabled to recognize issues or trends and make adjustments.

Controller 216 may further make assessments regarding operation of hydrogen-production installation 220 based on state data 218. For example, controller 216 may compare data regarding operations of hydrogen-production installation 220 as a whole, blocks of electrolyzers 222, and/or individual electrolyzers of electrolyzers 222 (e.g., data within or derived from state data 218) with simulated data 208. Based on such comparisons, controller 216 may determine whether hydrogen-production installation 220 as a whole, blocks of electrolyzers 222, and/or individual electrolyzers of electrolyzers 222 are performing as expected. Based on such determinations, controller 216 may adjust operations (e.g., adjusting operational parameters) of hydrogen-production installation 220 as a whole, blocks of electrolyzers 222, and/or individual electrolyzers of electrolyzers 222 (e.g., controlling operations of hydrogen-production installation 220). Additionally, or alternatively, based on such determinations, controller 216 may make recommendations regarding operation of hydrogen-production installation 220. For example, controller 216 may recommend that one or more of electrolyzers 222 be serviced. In some cases, hydrogen-production installation 220 may generate a report detailing and/or summarizing operations of hydrogen-production installation 220 as a whole, blocks of electrolyzers 222, and/or individual electrolyzers of electrolyzers 222.

As another example of assessments, controller 216 may compare state data 218 to terms and conditions of service-agreement data 214 to determine consequences resulting from operations of hydrogen-production installation 220. For example, controller 216 may determine whether hydrogen-production installation 220 met a service agreement (e.g., an HPA). If so, controller 216 may determine excess charges that may apply based on excess production of hydrogen. If not, controller 216 may determine consequences (e.g., financial consequences) for the owner or operator of hydrogen-production installation 220.

For example, an HPA may indicate that hydrogen-production installation 220 is to produce a certain amount (e.g., 17,280 kg) of $H_2$ over a month. Based on state data 218, controller 216 may determine how much $H_2$ was produced over the month. For instance, during a month, state data 218 may indicate that hydrogen-production installation 220 produced 12,960 kg of $H_2$ (e.g., a shortfall of 25%).

Further, state data 218 may indicate electrolyzers 222 (or a subset thereof) were partially available (e.g., not able to produce at full capacity) 10% of the month because electrolyzers 222 were not provided with sufficient resources to produce $H_2$ at full capacity. Controller 216 may determine how much $H_2$ could have been produced if not for the insufficiency of the resources. Controller 216 may determine financial consequences based on the determinations (e.g., reducing the shortfall based on how much $H_2$ could have been produced if electrolyzers 222 had sufficient resources).

Further, state data 218 may indicate that over the month, electrolyzers 222 (or a subset thereof) were at partially available based on inability to receive $H_2$ for 10% of the month. Controller 216 may determine how much $H_2$ could have been produced if not for the inability to receive $H_2$. Controller 216 may determine financial consequences based on the determinations (e.g., reducing the shortfall based on how much $H_2$ could have been produced if the consumer had been able to receive all the $H_2$ produced).

Further, state data 218 may indicate that electrolyzers 222 (or a subset thereof) were at partial capacity (e.g., 50% capacity) for 10% of the month based on an operator of hydrogen-production installation 220 providing a command decreasing operations of electrolyzers 222 to 50%. Controller 216 may determine how much $H_2$ could have been produced if not for the command. Controller 216 may determine financial consequences based on the determinations (e.g., reducing the shortfall based on how much $H_2$ could have been produced if electrolyzers 222 were commanded to operate at 100% capacity all month long, or not reducing the shortfall, depending on who issued the command).

Further, state data 218 may indicate that electrolyzers 222 (or a subset thereof) were unavailable for 1 day of the month based on an operator command for routine maintenance. Controller 216 may determine how much H$_2$ could have been produced if not for the command. Controller 216 may determine financial consequences based on the determinations. Such downtime categories maybe excluded from performance guarantee terms.

In some cases, controller 216 may generate an invoice detailing and/or summarizing all of the determinations regarding financial consequences.

Figure 3:
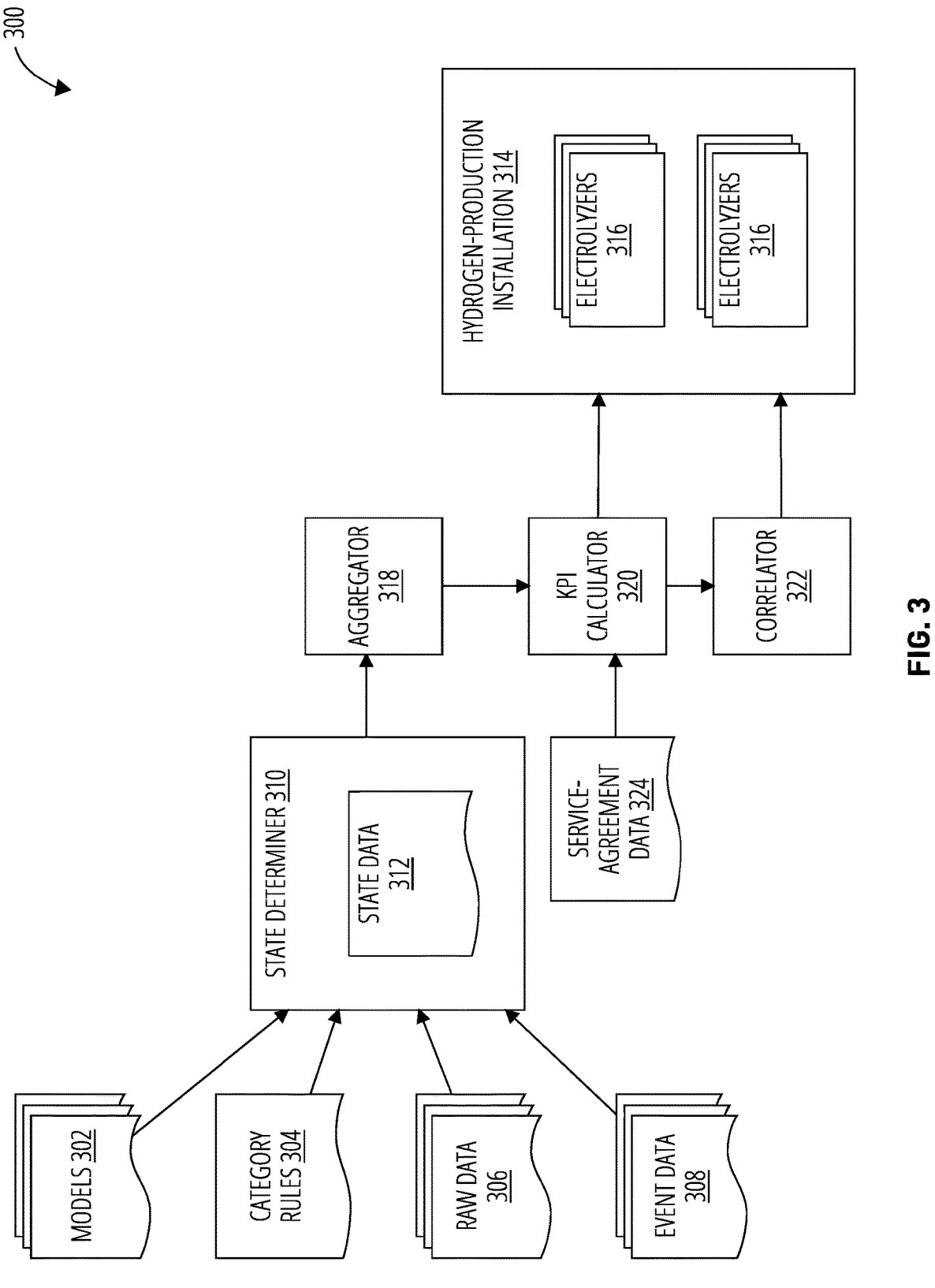
FIG. 3 is a diagram illustrating an example system including a for monitoring, assessing, and/or controlling operation of hydrogen-production installation, according to various embodiments of the present disclosure.

FIG. 3 is a diagram illustrating an example system 300 for monitoring, assessing, and/or controlling operation of hydrogen-production installation 314 according to various embodiments of the present disclosure. System 300 may receive various data from various sources and may perform operations responsive to the received data at multiple levels. With state availability assignment and aggregation, performance guarantee analysis may be done with the appropriate KPIs taking project contractual terms into account.

Category rules 304 may be rules defining availability states. For example, 304 may define an available state as when an asset (e.g., an electrolyzer, a block of electrolyzers, and/or a hydrogen-production installation) can be in service operation per specification regardless of the capacity level. Additionally, or alternatively, category rules 304 may define an unavailable state as when an asset it is not capable of operation to specification due to equipment failures, external restrictions, testing, maintenance, or other plant work being performed or some adverse condition. Additionally, or alternatively, category rules 304 may define partial availability states.

Models 302 may be the same as, or may be substantially similar to, models 206 of FIG. 2. Raw data 306 may be the same as, or may be substantially similar to, raw data 204 of FIG. 2. Event data 308 may be the same as, or may be substantially similar to, event data 212 of FIG. 2.

State determiner 310 may receive models 302, category rules 304, raw data 306 related to a period of time and/or event data 308 related to a period of time. For example, state determiner 310 may receive raw data 306 periodically (e.g., once per second) and/or event data (e.g., once per day) and aggregate the received raw data 306 and/or event data 308. State determiner 310 may determine state data 312 based on one or more of models 302, category rules 304, raw data 306, and event data 308. State data 312 may be the same as, or may be substantially similar to, state data 218 of FIG. 2. State determiner 310 may correlate raw data 306 with event data 308 and determine state data 312 based on how the correlated raw data 306 and event data 308 relate to category rules 304. State determiner 310 may determine an availability state of each electrolyzer of electrolyzers 316 for each of a number of discrete time periods (which discrete time periods may be, e.g., one minute long).

State determiner 310 may provide state data 312 to aggregator 318. Aggregator 318 may calculate a time duration each electrolyzer of electrolyzers 316 was in different states. For example, aggregator 318 may determine for how many minutes a given electrolyzer of electrolyzers 316 was unavailable and for how many minutes the electrolyzer was partially available. Further, aggregator 318 may determine a total H$_2$ production, a total power consumption, and/or a total water consumption of each electrolyzer of electrolyzers 316. Further still, aggregator 318 may determine for each state of each electrolyzer of electrolyzers 316 a total H$_2$ production, a total power consumption, and/or a total water consumption. Additionally, or alternatively, state determiner

310 may determine availability information, H$_2$ production information, power consumption information, and/or water consumption information on a per block and/or per plant basis.

Aggregator 318 may provide any or all of this information to KPI calculator 320. KPI calculator 320 may calculate one or more KPIs based on any or all of this information and on service-agreement data 324. Service-agreement data 324 may be the same as, or may be substantially similar to, service-agreement data 214 of FIG. 2. KPI calculator 320 may generate, among other things, data to support recommendations, data for display to an operator, reports, and/or invoices. For example, KPI calculator 320 may generate KPI data for display to the operator such that the operator may assess and/or control hydrogen-production installation 314. Further, KPI calculator 320 may generate reports (e.g., daily, weekly, monthly, quarterly, yearly) detailing, and/or summarizing, operation of hydrogen-production installation 314 and/or of individual ones of, or blocks of, electrolyzers 316. Further, KPI calculator 320 may generate invoices detailing, and/or summarizing, operation of hydrogen-production installation 314 and financial consequences thereof.

Correlator 322 may correlate event data 308 (including event logs and alarms) to KPIs, e.g., for cases that plant does not comply to contractual terms (e.g., terms of service-agreement data 324). Correlator 322 may correlate data for root cause analysis e.g., to assist an operator in preparing action plans.

State determiner 310, aggregator 318, KPI calculator 320, and/or correlator 322 may be included in a hydrogen-production installation (e.g., hydrogen-production installation 102 of FIG. 1). In some cases, state determiner 310, aggregator 318, KPI calculator 320, and/or correlator 322 may be remote from the hydrogen-production installation and may receive data from the hydrogen-production installation and/or provide control data to hydrogen-production installation. In some cases, state determiner 310, aggregator 318, KPI calculator 320, and/or correlator 322 may be implemented in a and/cloud or as a service.

Figure 4:
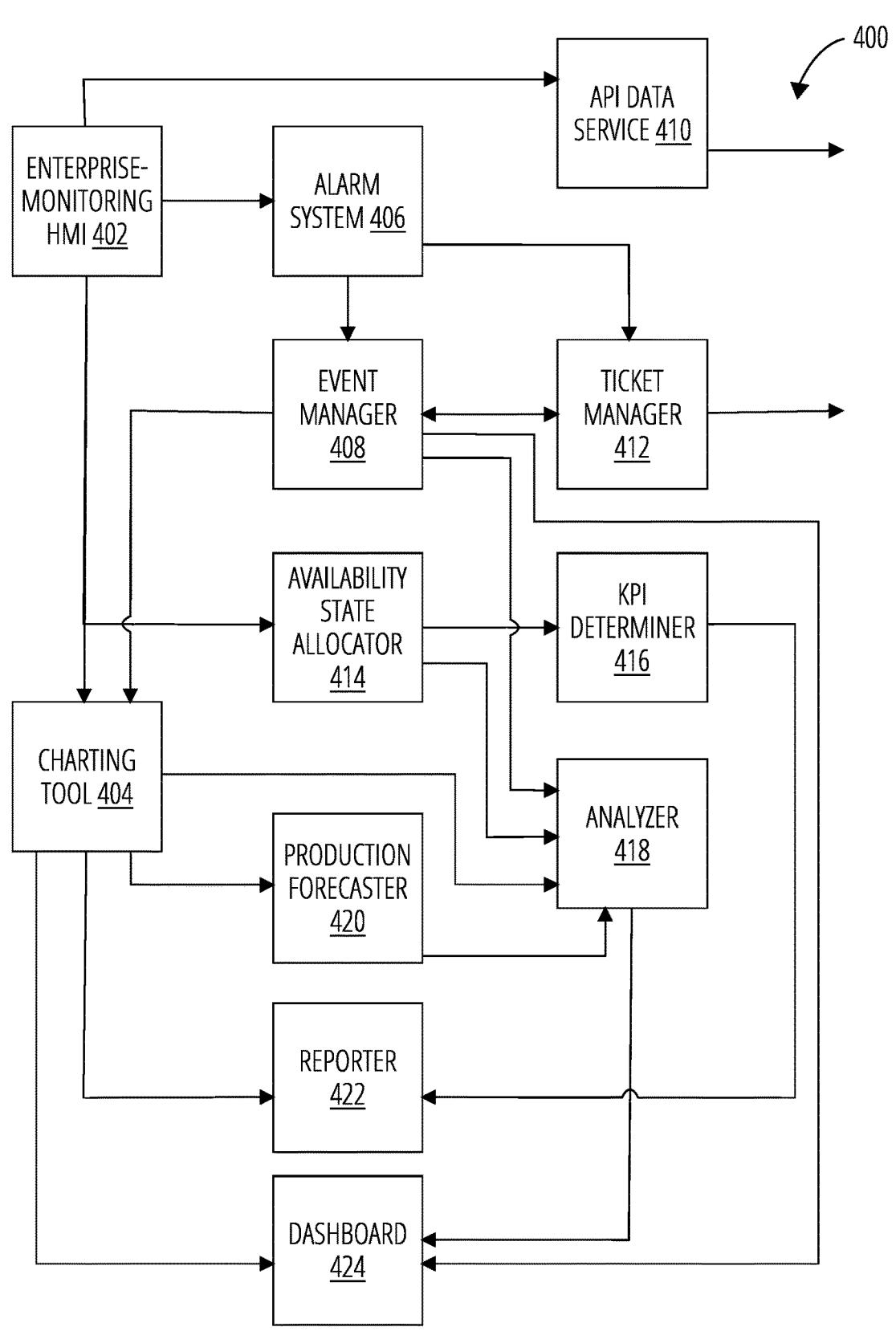
FIG. 4 is a diagram illustrating an example system including a for monitoring, assessing, and/or controlling operation of a hydrogen-production installation, according to various embodiments of the present disclosure.

FIG. 4 is a diagram illustrating an example system 400 for monitoring, assessing, and/or controlling operation of a hydrogen-production installation according to various embodiments of the present disclosure. System 400 may receive various data from various sources and may perform operations responsive to the received data.

System 400 may include an enterprise-monitoring human-machine interface (HMI) 402 which may provide for interactions between an operator and a hydrogen-production installation.

System 400 may include a charting tool 404 which may provide diagnostic charts, including provide trending and XY plots for KPIs, such as PG KPIs, System 400 may include an alarm system 406 which may generate alerts in response to pre-defined conditions.

System 400 may include an event manager 408 which may enable structuring (enriching) raw alarms for precise & efficient root cause analysis. For example, event manager 408 may allow for correlation between alerts and events and raw data.

System 400 may include an application programming interface (API) data service 410 that may provide for an interface between system 400 and external systems. API data service 410 may provide an interface for system 400 to interact with financial systems, e.g., billing systems.

System 400 may include a ticket manager 412 which may generate and/or receive tickets, e.g., field-service tickets. Ticket manager 412 may receive field tickets, or indications thereof, and provide information regarding the tickets to event manager 408, which may register the tickets as events.

System 400 may include an availability state allocator 414 which may structure (e.g., enrich) raw data for deep analysis at electrolyzer level, block level, and/or hydrogen-production installation. Availability state allocator 414 may categorize raw data into availability states according to availability state definitions.

System 400 may include KPI determiner 416 which may determine KPIs and/or assess performance of the hydrogen-production installation. For example, KPI determiner 416 may determine whether the hydrogen-production installation is meeting expectations based on KPIs.

System 400 may include an analyzer 418 which may analyze availability raw data, state data and/or KPIs. Analyzer 418 may determine a hydrogen-production installation loss using waterfall (loss tree) analysis. The analysis report may be useful to, for example, performance engineers and/or portfolio asset managers. Analyzer 418 may use high-resolution availability state allocations.

System 400 may include a production forecaster 420 which may estimate $H_2$ production, using machine-learning techniques, based on availability state categorization of time-series historical operation data, weather-forecast data, demand-side-$H_2$-forecast data, equipment-maintenance plans, and/or $H_2$-asset-health condition data.

System 400 may include a reporter 422 which may report performance (e.g., related to a performance guarantee) and/or waterfall analysis of losses and how the losses are contributing to production and operation reports. Reporter 422 may also generate and service and/or billing reports in automated standard format or user-initiated custom format, System 400 may include a dashboard 424 which may display data, including raw data, state-allocation data, and/or KPIs. Dashboard 424 may display time-based and/or production-based availability KPIs.

System 400 (and/or one or more elements thereof) may be included in a hydrogen-production installation (e.g., hydrogen-production installation 102 of FIG. 1). In some cases, system 400 (and/or one or more elements thereof) may be remote from the hydrogen-production installation and may receive data from the hydrogen-production installation and/or provide control data to hydrogen-production installation. In some cases, system 400 (and/or one or more elements thereof) may be implemented in a cloud and/or as a service.

FIG. 5 is a flow diagram illustrating a process 500 for monitoring, assessing, and/or controlling operations of a hydrogen-production installation, in accordance with embodiments of the present disclosure. One or more operations of process 500 may be performed by one or more computing devices (or apparatus) or a component (e.g., a chipset, codec, etc.) of the one or more computing devices. The one or more computing devices may be include one or more personal computers, server computers, laptop computers, or mobile devices. The one or more computing devices may be co-located with each other or remote from each other. For example, the one or more computing devices may be cloud computing devices. The one or more computing devices may be co-located with a hydrogen-production installation or remote from the hydrogen-production installation. The one or more operations of process 500 may be implemented as software components that are executed and run on one or more processors.

At block 502, the one or more computing devices (or one or more components thereof) may obtain raw data indicative of respective operations of respective electrolyzers of a plurality of electrolyzers of a hydrogen-production installation over a period of time. For example, controller 216 of FIG. 2 may obtain raw data 204 of FIG. 2. Raw data 204 may be indicative of operations of respective electrolyzers of electrolyzers 222 of FIG. 2 over a period of time. In some cases, the raw data may be, or may include, one or more of: an amount of electrical power consumed by respective electrolyzers of the plurality of electrolyzers, an amount of water consumed by respective electrolyzers of the plurality of electrolyzers, sensor data from respective sensors of respective electrolyzers of the plurality of electrolyzers, and/or ambient weather data. The raw data may include data representative of operation of each electrolyzer throughout the period of time.

At block 504, the one or more computing devices (or one or more components thereof) may obtain command data indicative of one or more commands provided to the plurality of electrolyzers over the period of time. For example, controller 216 may receive command data 210 of FIG. 2. Command data 210 may be indicative of one or more commands provided to electrolyzers 222 over the period of time. For example, the command data may include indications of how much $H_2$ to produce and/or how much power to consume. The command data may include commands for individual electrolyzers. The command data may include data representative of commands throughout the period of time.

At block 506, the one or more computing devices (or one or more components thereof) may obtain event data indicative of one or more events related to the plurality electrolyzers that occurred during the period of time. For example, controller 216 may obtain event data 212 of FIG. 2. Event data 212 may be indicative of one or more events related to electrolyzers 222 over the period of time. The event data may include data representative of events at each electrolyzer throughout the period of time. In some cases, the event data may be, or may include alarm data and/or field-service event logs.

At block 508, the one or more computing devices (or one or more components thereof) may generate state data based on the raw data, the command data, and the event data, the state data comprising a respective state of each electrolyzer of the plurality of electrolyzers for each of a number of discrete time periods of the period of time. For example, controller 216 may generate state data 218 of FIG. 2. State data 218 may include a respective state of each electrolyzer of electrolyzers 222 for each of a number of discrete time periods of the period of time.

In some cases, controller 216 may generate the state data, at least in part, by determining the respective state of each electrolyzer of the plurality of electrolyzers for each of the number of discrete time periods of the period of time based on the raw data, the command data, and the event data. For example, for each discrete time period, controller 216 may determine a state, e.g., an availability state, for each electrolyzer of electrolyzers 222.

In some cases, process 500 may additionally include obtaining simulated data and generating the state data (e.g., at block 508) may be further based on the simulated data. In some cases, the simulated data may be derived based on one or more of: an electrolyzer model, the electrolyzer model corresponding to at least one electrolyzer of the plurality of electrolyzers, a hydrogen-production-installation model corresponding to the hydrogen-production installation, an environmental model related to an environment of the hydrogen-production installation, a power-provider model related to a source of power of the hydrogen-production installation, a water-provider model related to a source of water of the hydrogen-production installation, and/or a hydrogen-production schedule. In some cases, process 500 may include obtaining simulated data representative of simulated operation of an electrolyzer model, the electrolyzer model corresponding to at least one electrolyzer of the plurality of electrolyzers. Generating the state data (e.g., at block 508) may be further based on the simulated data. For example, controller 216 may obtain simulated data 208 of FIG. 2, which may be based on models 206 of FIG. 2. In some cases, process 500 may include updating the electrolyzer model.

In some cases, the state data may include codes corresponding to one or more of: full capability, partial capability, service set points, scheduled maintenance, and/or unavailable. In some cases, each of the number of discrete time periods may be one minute long.

At block 510, the one or more computing devices (or one or more components thereof) may perform one or more operations responsive to the state data. For example, controller 216 may perform one or more operations.

Examples of the operations of block 510 include, monitoring, assessing, and/or controlling operation of hydrogen-production installation 220 of FIG. 2 and/or of respective electrolyzers of electrolyzers 222.

For example, controller 216 may serve site-level monitoring-and-control software applications. Such site-level monitoring-and-control software applications may, among other things, provide a user with data visualization (e.g., charts or tables) for site-level $H_2$ production, system views, alarm system, and/or weather forecast data in addition to the $H_2$ plant control HMI and logs. As another example, controller 216 may monitor and/or control hydrogen production of the hydrogen-production installation at a site-level. As another example, controller 216 may serve fleet-level monitoring-and-control software applications. Such fleet-level monitoring-and-control software applications may, among other things, provide a user with group-level $H_2$ production and performance insights for multiple hydrogen-production installations. For example, such fleet-level monitoring-and-control software applications may provide data for an entire portfolio of the user, sites located in a region, and/or a category of sites under monitoring and control. As another example, controller 216 may monitor and control the hydrogen production of the hydrogen-production installation at a fleet-level.

As another example, controller 216 may serve an assessor of hydrogen-production-asset health. Such an assessor may be a software application that may provide a user with performance indicators for an $H_2$ plant's asset health for subsystems including electrolyzer stacks, power electronics, water filtering systems, dryer systems, universal power supply (UPS)/battery systems, thermal management systems, etc. As another example, controller 216 may assess hydrogen-production-asset health. As another example, controller 216 may serve an assessor of performance of an installed operating system. Such an assessor may be a software application that may provide a user with an assessment of $H_2$ plant performance including actual an performance versus expected performance assessment, a production-loss assessment, and/or a conversion-efficiency assessment (e.g., describing an efficiency of converting power to $H_2$). As another example, controller 216 may assess performance of the hydrogen production of the hydrogen-production installation. As another example, controller 216 may serve an assessor of compliance of the installed operating system. Such an assessor may be a software application that may provide a user with a compliance assessment of an $H_2$ plant including a performance-guarantee assessment, a time-based availability assessment, and/or a production-based availability assessment. As another example, controller 216 may assess compliance of the hydrogen production of the hydrogen-production installation.

As another example, controller 216 may adjust hydrogen production of one or more electrolyzers of the plurality of electrolyzers. For example, controller 216 may increase or decrease an amount of $H_2$ being produced by one or more of electrolyzers 222. As another example, controller 216 may recommend maintenance for one or more electrolyzers of the plurality of electrolyzers. As another example, controller 216 may generate an alert related to one or more electrolyzers of the plurality of electrolyzers. As another example, controller 216 may generate an invoice related to aggregated operations of the plurality of electrolyzers.

In some cases, the invoice may be based on conditions related to one or more of: the one or more commands, the one or more events, aggregated operations of the plurality of electrolyzers over the period of time or a service agreement. For example, the invoice may be based on a service agreement and an amount of $H_2$ produced according to the service agreement. Further the invoice may be based, at least in part, on exclusion provided by the service agreement and based on whether conditions of the exclusions were met. As another example, controller 216 may generate a report indicative of the respective operations of the respective electrolyzers of the plurality of electrolyzers. As another example, controller 216 may recommend a control adjustment to a consumer of hydrogen. For example, controller 216 may recommend an adjustment to operation of one or more of: a buffer tank, a compressor, a storage cylinder. For example, an $H_2$ plant may have a capacity of 6 kg/hour production connected to a buffer tank of 0.1 kg, 5-30 bar capacity, connected to compressor 7 kg/hour, 200 bar capacity. An electrolyzer of the $H_2$ plant may start production when buffer tank pressure is below 5 bar pressure and may stop production when buffer tank reaches 27 bar pressure. Controller 216 may cause the electrolyzer to operate for a certain number of hours per day with an optimal stop/start/de-rate control command strategy to support Balance of Plant (BoP) system operation. As another example, controller 216 may adjust operational parameters of one or more of: a buffer tank, a compressor, a storage cylinder (e.g., to support BoP system operations).

As another example, controller 216 may recommend an input-resource adjustment. As another example, controller 216 may send a signal requesting a change in an amount of water to be provided to the hydrogen-production installation. As another example, controller 216 may send a signal requesting a change in an amount of electricity be provided to the hydrogen-production installation. As another example, controller 216 may recommend grid-interconnect ancillary services dispatch service adjustment. For example, controller 216 that may recommend that an $H_2$ plant receives a grid control signal to adjust reactive-power absorption to maintain a power factor within a specific operating range.

In some examples, the methods described herein (e.g., process 500 of FIG. 5, and/or other methods described herein) can be performed, in whole or in part, by one or more computing devices or apparatuses. In one example, one or more of the methods can be performed by system 100 of FIG. 1, controller 108 of FIG. 1, system 200 of FIG. 2, controller 216 of FIG. 2, system 300 of FIG. 3, state determiner 310 of FIG. 3, aggregator 318 of FIG. 3, KPI calculator 320 of FIG. 3, correlator 322 of FIG. 3, system 400 of FIG. 4, enterprise-monitoring HMI 402 of FIG. 4, charting tool 404 of FIG. 4, alarm system 406 of FIG. 4, event manager 408 of FIG. 4, API data service 410 of FIG. 4, ticket manager 412 of FIG. 4, availability state allocator 414 of FIG. 4, KPI determiner 416 of FIG. 4, analyzer 418 of FIG. 4, production forecaster 420 of FIG. 4, reporter 422 of FIG. 4, dashboard 424 of FIG. 4, and/or by another system or device. In another example, one or more of the methods can be performed, in whole or in part, by one or more instances of computing-device architecture 600 shown in FIG. 6. For instance, one or more computing devices with the computing-device architecture 600 shown in FIG. 6 can include, or be included in, the components of system 100 of FIG. 1, controller 108 of FIG. 1, system 200 of FIG. 2, controller 216 of FIG. 2, system 300 of FIG. 3, state determiner 310 of FIG. 3, aggregator 318 of FIG. 3, KPI calculator 320 of FIG. 3, correlator 322 of FIG. 3, system 400 of FIG. 4, enterprise-monitoring HMI 402 of FIG. 4, charting tool 404 of FIG. 4, alarm system 406 of FIG. 4, event manager 408 of FIG. 4, API data service 410 of FIG. 4, ticket manager 412 of FIG. 4, availability state allocator 414 of FIG. 4, KPI determiner 416 of FIG. 4, analyzer 418 of FIG. 4, production forecaster 420 of FIG. 4, reporter 422 of FIG. 4, dashboard 424 of FIG. 4 and can implement the operations of process 500, and/or other process described herein.

The one or more computing devices can include any suitable device, such as one or more desktop computing devices, one or more tablet computing devices, one or more laptop computing devices, one or more server computers, one or more mobile devices, and/or any other computing device with the resource capabilities to perform the processes described herein, including process 500, and/or other process described herein. In some cases, each computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 500 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 500, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 6:
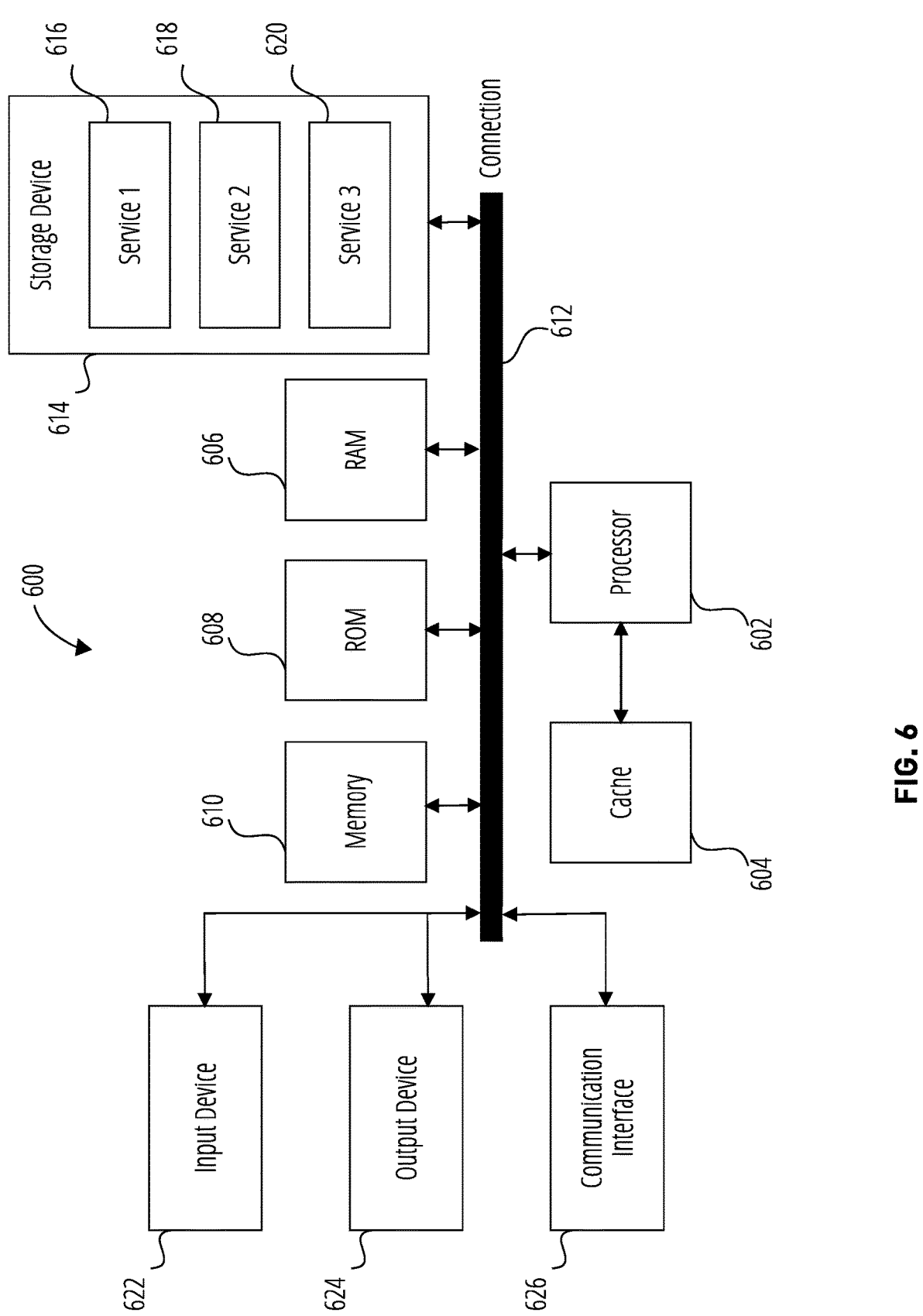
FIG. 6 illustrates an example computing-device architecture of an example computing device which can implement the various techniques described herein.

FIG. 6 illustrates an example computing-device architecture 600 of an example computing device which can implement the various techniques described herein. In some examples, the computing device can include a mobile device, a personal computer, a laptop computer, a server computer. For example, the computing-device architecture 600 may include, implement, or be included in any or all of system 100 of FIG. 1, controller 108 of FIG. 1, system 200 of FIG. 2, controller 216 of FIG. 2, system 300 of FIG. 3, state determiner 310 of FIG. 3, aggregator 318 of FIG. 3, KPI calculator 320 of FIG. 3, correlator 322 of FIG. 3, system 400 of FIG. 4, enterprise-monitoring HMI 402 of FIG. 4, charting tool 404 of FIG. 4, alarm system 406 of FIG. 4, event manager 408 of FIG. 4, API data service 410 of FIG. 4, ticket manager 412 of FIG. 4, availability state allocator 414 of FIG. 4, KPI determiner 416 of FIG. 4, analyzer 418 of FIG. 4, production forecaster 420 of FIG. 4, reporter 422 of FIG. 4, dashboard 424 of FIG. 4.

The components of computing-device architecture 600 are shown in electrical communication with each other using connection 612, such as a bus. The example computing-device architecture 600 includes a processing unit (CPU or processor) 602 and computing device connection 612 that couples various computing device components including computing device memory 610, such as read only memory (ROM) 608 and random-access memory (RAM) 606, to processor 602.

Computing-device architecture 600 can include a cache of high-speed memory connected directly with, in close proximity to, or integrated as part of processor 602. Computing-device architecture 600 can copy data from memory 610 and/or the storage device 614 to cache 604 for quick access by processor 602. In this way, the cache can provide a performance boost that avoids processor 602 delays while waiting for data. These and other modules can control or be configured to control processor 602 to perform various actions. Other computing device memory 610 may be available for use as well. Memory 610 can include multiple different types of memory with different performance characteristics. Processor 602 can include any general-purpose processor and a hardware or software service, such as service 1 616, service 2 618, and service 3 620 stored in storage device 614, configured to control processor 602 as well as a special-purpose processor where software instructions are incorporated into the processor design. Processor 602 may be a self-contained system, containing multiple cores or processors, a bus, memory controller, cache, etc. A multi-core processor may be symmetric or asymmetric.

To enable user interaction with the computing-device architecture 600, input device 622 can represent any number of input mechanisms, such as a microphone for speech, a touch-sensitive screen for gesture or graphical input, keyboard, mouse, motion input, speech and so forth. Output device 624 can also be one or more of a number of output mechanisms known to those of skill in the art, such as a display, projector, television, speaker device, etc. In some instances, multimodal computing devices can enable a user to provide multiple types of input to communicate with computing-device architecture 600. Communication interface 626 can generally govern and manage the user input and computing device output. There is no restriction on operating on any particular hardware arrangement and therefore the basic features here may easily be substituted for improved hardware or firmware arrangements as they are developed.

Storage device 614 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 606, read only memory (ROM) 608, and hybrids thereof. Storage device 614 can include services 616, 618, and 620 for controlling processor 602. Other hardware or software modules are contemplated. Storage device 614 can be connected to the computing device connection 612. In one embodiment, a hardware module that performs a particular function can include the software component stored in a computer-readable medium in connection with the necessary hardware components, such as processor 602, connection 612, output device 624, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Embodiments of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, embodiments of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various embodiments of this disclosure, the term "device" is not limited to a specific configuration, type, or number of objects. Additionally, the term "system" is not limited to multiple components or specific embodiments. For example, a system may be implemented on one or more printed circuit boards or other substrates and may have movable or static components. While the below description and examples use the term "system" to describe various embodiments of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media, magnetic disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, embodiments of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and embodiments of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative embodiments of the disclosure include:

Embodiment 1. A method comprising: obtaining raw data indicative of respective operations of respective electrolyzers of a plurality of electrolyzers of a hydrogen-production installation over a period of time; obtaining command data indicative of one or more commands provided to the plurality of electrolyzers over the period of time; obtaining event data indicative of one or more events related to the plurality electrolyzers that occurred during the period of time; generating state data based on the raw data, the command data, and the event data, the state data comprising a respective state of each electrolyzer of the plurality of electrolyzers for each of a number of discrete time periods of the period of time; and performing one or more operations responsive to the state data.

Embodiment 2. The method of embodiment 1, wherein the one or more operations comprise one or more of: serving a site-level monitoring-and-control software application; monitoring and controlling hydrogen production of the hydrogen-production installation at a site-level; serving a fleet-level monitoring-and-control software application; monitoring and controlling the hydrogen production of the hydrogen-production installation at a fleet-level; serving an assessor of hydrogen-production-asset health; assessing hydrogen-production-asset health; serving an assessor of performance of an installed operating system; assessing performance of the hydrogen production of the hydrogen-production installation; serving an assessor of compliance of the installed operating system; assessing compliance of the hydrogen production of the hydrogen-production installation; adjusting hydrogen production of one or more electrolyzers of the plurality of electrolyzers; recommending maintenance for one or more electrolyzers of the plurality of electrolyzers; generating an alert related to one or more electrolyzers of the plurality of electrolyzers; generating an invoice related to aggregated operations of the plurality of electrolyzers, wherein the invoice is based on conditions related to one or more of: the one or more commands, the one or more events, aggregated operations of the plurality of electrolyzers over the period of time or a service agreement; generating a report indicative of the respective operations of the respective electrolyzers of the plurality of electrolyzers; recommending a control adjustment to a consumer of hydrogen, the control adjustment relating to one or more of: a buffer tank of the consumer, a compressor of the consumer, a storage cylinder of the consumer; adjusting operational parameters of one or more of: a buffer tank, a compressor, a storage cylinder; recommending an input-resource adjustment; sending a signal requesting a change in an amount of water to be provided to the hydrogen-production installation; sending a signal requesting a change in an amount of electricity be provided to the hydrogen-production installation; or recommending grid-interconnect ancillary services dispatch service adjustment.

Embodiment 3. The method of embodiment 1, wherein the one or more operations comprise one or more of: assessing hydrogen-production-asset health; assessing performance of hydrogen production of the hydrogen-production installation; assessing compliance of the hydrogen production of the hydrogen-production installation; adjusting hydrogen production of one or more electrolyzers of the plurality of electrolyzers; recommending maintenance for one or more electrolyzers of the plurality of electrolyzers; generating an alert related to one or more electrolyzers of the plurality of electrolyzers; generating an invoice related to aggregated operations of the plurality of electrolyzers, wherein the invoice is based on conditions related to one or more of: the one or more commands, the one or more events, aggregated operations of the plurality of electrolyzers over the period of time or a service agreement; generating a report indicative of the respective operations of the respective electrolyzers of the plurality of electrolyzers; adjusting operational parameters of one or more of: a buffer tank, a compressor, a storage cylinder; sending a signal requesting a change in an amount of water to be provided to the hydrogen-production installation; sending a signal requesting a change in an amount of electricity be provided to the hydrogen-production installation; or recommending grid-interconnect ancillary services dispatch service adjustment.

Embodiment 4. The method of any one of embodiments 1 to 3, wherein generating the state data comprises determining the respective state of each electrolyzer of the plurality of electrolyzers for each of the number of discrete time periods of the period of time based on the raw data, the command data, and the event data.

Embodiment 5. The method of any one of embodiments 1 to 4, wherein the raw data comprises one or more of: an amount of electrical power consumed by respective electrolyzers of the plurality of electrolyzers; an amount of water consumed by respective electrolyzers of the plurality of electrolyzers; sensor data from respective sensors of respective electrolyzers of the plurality of electrolyzers; or ambient weather data.

Embodiment 6. The method of any one of embodiments 1 to 5, further comprising obtaining simulated data, wherein generating the state data is further based on the simulated data.

Embodiment 7. The method of embodiment 6, wherein the simulated data is derived based on one or more of: an electrolyzer model, the electrolyzer model corresponding to at least one electrolyzer of the plurality of electrolyzers; a hydrogen-production-installation model corresponding to the hydrogen-production installation; an environmental model related to an environment of the hydrogen-production installation; a power-provider model related to a source of power of the hydrogen-production installation; a water-provider model related to a source of water of the hydrogen-production installation; or a hydrogen-production schedule.

Embodiment 8. The method of any one of embodiments 1 to 7, further comprising obtaining simulated data representative of simulated operation of an electrolyzer model, the electrolyzer model corresponding to at least one electrolyzer of the plurality of electrolyzers, wherein generating the state data is further based on the simulated data.

Embodiment 9. The method of embodiment 8, further comprising updating the electrolyzer model.

Embodiment 10. The method of any one of embodiments 1 to 9, wherein the event data comprises one or more of: alarm data; or field-service event logs.

Embodiment 11. The method of any one of embodiments 1 to 10, wherein the state data includes codes corresponding to one or more of: full capability; partial capability; service set points; scheduled maintenance; or unavailable.

Embodiment 12. The method of any one of embodiments 1 to 11, wherein each of the number of discrete time periods is one minute long.

Embodiment 13. A system comprising: a plurality of electrolyzers; and a controller configured to: obtain raw data indicative of respective operations of respective electrolyzers of the plurality of electrolyzers over a period of time; obtain command data indicative of one or more commands provided to the plurality of electrolyzers over the period of time; obtain event data indicative of one or more events related to the plurality electrolyzers that occurred during the period of time; generate state data based on the raw data, the command data, and the event data, the state data comprising a respective state of each electrolyzer of the plurality of electrolyzers for each of a number of discrete time periods of the period of time; and perform one or more operations responsive to the state data.

Embodiment 14. The system of embodiment 13, wherein the one or more operations comprise one or more of: serving a site-level monitoring-and-control software application; monitoring and controlling hydrogen production of a hydrogen-production installation at a site-level; serving a fleet-level monitoring-and-control software application; monitoring and controlling the hydrogen production of the hydrogen-production installation at a fleet-level; serving an assessor of hydrogen-production-asset health; assessing hydrogen-production-asset health; serving an assessor of performance of an installed operating system; assessing performance of the hydrogen production of the hydrogen-production installation; serving an assessor of compliance of the installed operating system; assessing compliance of the hydrogen production of the hydrogen-production installation; adjusting hydrogen production of one or more electrolyzers of the plurality of electrolyzers; recommending maintenance for one or more electrolyzers of the plurality of electrolyzers; generating an alert related to one or more electrolyzers of the plurality of electrolyzers; generating an invoice related to aggregated operations of the plurality of electrolyzers, wherein the invoice is based on conditions related to one or more of: the one or more commands, the one or more events, aggregated operations of the plurality of electrolyzers over the period of time or a service agreement; generating a report indicative of the respective operations of the respective electrolyzers of the plurality of electrolyzers; recommending a control adjustment to a consumer of hydrogen, the control adjustment relating to one or more of: a buffer tank of the consumer, a compressor of the consumer, a storage cylinder of the consumer; adjusting operational parameters of one or more of: a buffer tank, a compressor, a storage cylinder; recommending an input-resource adjustment; sending a signal requesting a change in an amount of water to be provided to the hydrogen-production installation; sending a signal requesting a change in an amount of electricity be provided to the hydrogen-production installation; or recommending grid-interconnect ancillary services dispatch service adjustment.

Embodiment 15. The system of any one of embodiments 13 or 14, wherein the controller is remote from the plurality of electrolyzers.

Embodiment 16. The system of any one of embodiments 13 or 14, wherein the controller is collocated with the plurality of electrolyzers.

Embodiment 17. The system of any one of embodiments 13 to 15, wherein the controller is implemented in one or more remote servers.

Embodiment 18. An apparatus for controlling operations of electrolyzers, the apparatus comprising: at least one memory; and at least one processor coupled to the at least one memory and configured to: obtain raw data indicative of respective operations of respective electrolyzers of a plurality of electrolyzers of a hydrogen-production installation over a period of time; obtain command data indicative of one or more commands provided to the plurality of electrolyzers over the period of time; obtain event data indicative of one or more events related to the plurality electrolyzers that occurred during the period of time; generate state data based on the raw data, the command data, and the event data, the state data comprising a respective state of each electrolyzer of the plurality of electrolyzers for each of a number of discrete time periods of the period of time; and perform one or more operations responsive to the state data.

Embodiment 19. The apparatus of embodiment 18, wherein the one or more operations comprise one or more of: serving a site-level monitoring-and-control software application; monitoring and controlling hydrogen production of the hydrogen-production installation at a site-level; serving a fleet-level monitoring-and-control software application; monitoring and controlling the hydrogen production of the hydrogen-production installation at a fleet-level; serving an assessor of hydrogen-production-asset health; assessing hydrogen-production-asset health; serving an assessor of performance of an installed operating system; assessing performance of the hydrogen production of the hydrogen-production installation; serving an assessor of compliance of the installed operating system; assessing compliance of the hydrogen production of the hydrogen-production installation; adjusting hydrogen production of one or more electrolyzers of the plurality of electrolyzers; recommending maintenance for one or more electrolyzers of the plurality of electrolyzers; generating an alert related to one or more electrolyzers of the plurality of electrolyzers; generating an invoice related to aggregated operations of the plurality of electrolyzers, wherein the invoice is based on conditions related to one or more of: the one or more commands, the one or more events, aggregated operations of the plurality of electrolyzers over the period of time or a service agreement; generating a report indicative of the respective operations of the respective electrolyzers of the plurality of electrolyzers; recommending a control adjustment to a consumer of hydrogen, the control adjustment relating to one or more of: a buffer tank of the consumer, a compressor of the consumer, a storage cylinder of the consumer; adjusting operational parameters of one or more of: a buffer tank, a compressor, a storage cylinder; recommending an input-resource adjustment; sending a signal requesting a change in an amount of water to be provided to the hydrogen-production installation; sending a signal requesting a change in an amount of electricity be provided to the hydrogen-production installation; or recommending grid-interconnect ancillary services dispatch service adjustment.

Embodiment 20. The apparatus of any one of embodiments 18 or 19, wherein the apparatus is remote from the plurality of electrolyzers.

What is claimed is:

1. A method comprising:

obtaining a raw data set comprising raw data indicative of respective operations of each electrolyzer of a plurality of electrolyzers of a hydrogen-production installation over a period of time;

obtaining command data indicative of one or more commands provided to at least one of the plurality of electrolyzers over the period of time;

obtaining event data indicative of one or more events related to at least one of the plurality electrolyzers that occurred during the period of time;

obtaining a simulated data set from one or more models wherein the simulated data set comprises simulated data indicative of predicted performance of each electrolyzer of the plurality of electrolyzers over the period of time;

generating state data based on the raw data set, the command data, the simulated data set, and the event data, the state data comprising a respective state of each electrolyzer of the plurality of electrolyzers for each of a number of discrete time periods of the period of time; and performing one or more operations responsive to the state data.

2. The method of claim 1, wherein the one or more operations comprise one or more of:

serving a site-level monitoring-and-control software application;

monitoring and controlling hydrogen production of the hydrogen-production installation at a site-level;

serving a fleet-level monitoring-and-control software application;

monitoring and controlling the hydrogen production of the hydrogen-production installation at a fleet-level;

serving an assessor of hydrogen-production-asset health;

assessing hydrogen-production-asset health;

serving an assessor of performance of an installed operating system;

assessing performance of the hydrogen production of the hydrogen-production installation;

serving an assessor of compliance of the installed operating system;

assessing compliance of the hydrogen production of the hydrogen-production installation;

adjusting hydrogen production of one or more electrolyzers of the plurality of electrolyzers;

recommending maintenance for one or more electrolyzers of the plurality of electrolyzers;

generating an alert related to one or more electrolyzers of the plurality of electrolyzers;

generating an invoice related to aggregated operations of the plurality of electrolyzers, wherein the invoice is based on conditions related to one or more of: the one or more commands, the one or more events, aggregated operations of the plurality of electrolyzers over the period of time or a service agreement;

generating a report indicative of the respective operations of the respective electrolyzers of the plurality of electrolyzers;

recommending a control adjustment to a consumer of hydrogen, the control adjustment relating to one or more of: a buffer tank of the consumer, a compressor of the consumer, a storage cylinder of the consumer;

adjusting operational parameters of one or more of: a buffer tank, a compressor, a storage cylinder;

recommending an input-resource adjustment;

sending a signal requesting a change in an amount of water to be provided to the hydrogen-production installation;

sending a signal requesting a change in an amount of electricity be provided to the hydrogen-production installation; or recommending grid-interconnect ancillary services dispatch service adjustment.

3. The method of claim 1, wherein the one or more operations comprise one or more of:

assessing hydrogen-production-asset health;

assessing performance of hydrogen production of the hydrogen-production installation;

assessing compliance of the hydrogen production of the hydrogen-production installation;

adjusting hydrogen production of one or more electrolyzers of the plurality of electrolyzers;

recommending maintenance for one or more electrolyzers of the plurality of electrolyzers;

generating an alert related to one or more electrolyzers of the plurality of electrolyzers;

generating an invoice related to aggregated operations of the plurality of electrolyzers, wherein the invoice is based on conditions related to one or more of: the one or more commands, the one or more events, aggregated operations of the plurality of electrolyzers over the period of time or a service agreement;

generating a report indicative of the respective operations of the respective electrolyzers of the plurality of electrolyzers;

adjusting operational parameters of one or more of: a buffer tank, a compressor, a storage cylinder;

sending a signal requesting a change in an amount of water to be provided to the hydrogen-production installation;

sending a signal requesting a change in an amount of electricity be provided to the hydrogen-production installation; or recommending grid-interconnect ancillary services dispatch service adjustment.

4. The method of claim 1, wherein generating the state data comprises determining the respective state of each electrolyzer of the plurality of electrolyzers for each of the number of discrete time periods of the period of time based on the raw data, the command data, and the event data.

5. The method of claim 1, wherein the raw data comprises one or more of:

an amount of electrical power consumed by respective electrolyzers of the plurality of electrolyzers;

an amount of water consumed by respective electrolyzers of the plurality of electrolyzers;

sensor data from respective sensors of respective electrolyzers of the plurality of electrolyzers; or ambient weather data.

6. The method of claim 1, wherein the one or more models include:

an electrolyzer model, the electrolyzer model corresponding to at least one electrolyzer of the plurality of electrolyzers;

a hydrogen-production-installation model corresponding to the hydrogen-production installation;

an environmental model related to an environment of the hydrogen-production installation;

a power-provider model related to a source of power of the hydrogen-production installation; or a water-provider model related to a source of water of the hydrogen-production installation.

7. The method of claim 1, further comprising updating at least one of the one or more models.

8. The method of claim 1, wherein the event data comprises one or more of:

alarm data; or field-service event logs.

9. The method of claim 1, wherein the state data includes codes corresponding to one or more of:

full capability;

partial capability;

service set points;

scheduled maintenance; or unavailable.

10. The method of claim 1, wherein each of the number of discrete time periods is one minute long.

11. A system comprising:

a plurality of electrolyzers; and a controller configured to:

obtain a raw data set comprising raw data indicative of respective operations of each electrolyzer of the plurality of electrolyzers over a period of time;

obtain command data indicative of one or more commands provided to at least one of the plurality of electrolyzers over the period of time;

obtain event data indicative of one or more events related to at least one of the plurality electrolyzers that occurred during the period of time;

generate state data based on the raw data set, the command data, and the event data, the state data comprising a respective state of each electrolyzer of the plurality of electrolyzers for each of a number of discrete time periods of the period of time;

perform one or more operations responsive to the state data, the one or more operations including assessing at least one of hydrogen production asset health or compliance, wherein assessing asset health includes generating an asset health assessment including at least one of an actual performance versus expected performance assessment, a production-loss assessment, or a conversion-efficiency assessment, and wherein assessing compliance comprises generating a compliance assessment including at least one of a performance-guarantee assessment, a time-based availability assessment, or a production-based availability assessment; and display at least one of the asset health assessment or the compliance assessment.

12. The system of claim 11, wherein the one or more operations further comprise one or more of:

serving a site-level monitoring-and-control software application;

monitoring and controlling hydrogen production of a hydrogen-production installation at a site-level;

serving a fleet-level monitoring-and-control software application;

monitoring and controlling the hydrogen production of the hydrogen-production installation at a fleet-level;

serving an assessor of hydrogen-production-asset health;

assessing hydrogen-production-asset health;

serving an assessor of performance of an installed operating system;

assessing performance of the hydrogen production of the hydrogen-production installation;

serving an assessor of compliance of the installed operating system;

assessing compliance of the hydrogen production of the hydrogen-production installation;

adjusting hydrogen production of one or more electrolyzers of the plurality of electrolyzers;

recommending maintenance for one or more electrolyzers of the plurality of electrolyzers;

generating an alert related to one or more electrolyzers of the plurality of electrolyzers;

generating an invoice related to aggregated operations of the plurality of electrolyzers, wherein the invoice is based on conditions related to one or more of: the one or more commands, the one or more events, aggregated operations of the plurality of electrolyzers over the period of time or a service agreement;

generating a report indicative of the respective operations of the respective electrolyzers of the plurality of electrolyzers;

recommending a control adjustment to a consumer of hydrogen, the control adjustment relating to one or more of: a buffer tank of the consumer, a compressor of the consumer, a storage cylinder of the consumer;

adjusting operational parameters of one or more of: a buffer tank, a compressor, a storage cylinder;

recommending an input-resource adjustment;

sending a signal requesting a change in an amount of water to be provided to the hydrogen-production installation;

sending a signal requesting a change in an amount of electricity be provided to the hydrogen-production installation; or recommending grid-interconnect ancillary services dispatch service adjustment.

13. The system of claim 11, wherein the controller is remote from the plurality of electrolyzers.

14. The system of claim 11, wherein the controller is collocated with the plurality of electrolyzers.

15. The system of claim 11, wherein the controller is implemented in one or more remote servers.

16. An apparatus for controlling operations of electrolyzers, the apparatus comprising:

at least one memory; and at least one processor coupled to the at least one memory and configured to:

obtain a raw data set comprising raw data indicative of respective operations of each electrolyzers of a plurality of electrolyzers of a hydrogen-production installation over a period of time, wherein the raw data includes one or more of:

an amount of electrical power consumed by respective electrolyzers of the plurality of electrolyzers;

an amount of water consumed by respective electrolyzers of the plurality of electrolyzers; or ambient weather data;

obtain command data indicative of one or more commands provided to at least one of the plurality of electrolyzers over the period of time;

obtain event data indicative of one or more events related to at least one of the plurality electrolyzers that occurred during the period of time;

generate state data based on the raw data set, the command data, and the event data, the state data comprising a respective state of each electrolyzer of the plurality of electrolyzers for each of a number of discrete time periods of the period of time; and perform one or more operations responsive to the state data.

17. The apparatus of claim 16, wherein the one or more operations comprise one or more of:

serving a site-level monitoring-and-control software application;

monitoring and controlling hydrogen production of the hydrogen-production installation at a site-level;

serving a fleet-level monitoring-and-control software application;

monitoring and controlling the hydrogen production of the hydrogen-production installation at a fleet-level;

serving an assessor of hydrogen-production-asset health;

assessing hydrogen-production-asset health;

serving an assessor of performance of an installed operating system;

assessing performance of the hydrogen production of the hydrogen-production installation;

serving an assessor of compliance of the installed operating system;

assessing compliance of the hydrogen production of the hydrogen-production installation;

adjusting hydrogen production of one or more electrolyzers of the plurality of electrolyzers;

recommending maintenance for one or more electrolyzers of the plurality of electrolyzers;

generating an alert related to one or more electrolyzers of the plurality of electrolyzers;

generating an invoice related to aggregated operations of the plurality of electrolyzers, wherein the invoice is based on conditions related to one or more of: the one or more commands, the one or more events, aggregated operations of the plurality of electrolyzers over the period of time or a service agreement;

generating a report indicative of the respective operations of the respective electrolyzers of the plurality of electrolyzers;

recommending a control adjustment to a consumer of hydrogen, the control adjustment relating to one or more of: a buffer tank of the consumer, a compressor of the consumer, a storage cylinder of the consumer;

adjusting operational parameters of one or more of: a buffer tank, a compressor, a storage cylinder;

recommending an input-resource adjustment;

sending a signal requesting a change in an amount of water to be provided to the hydrogen-production installation;

sending a signal requesting a change in an amount of electricity be provided to the hydrogen-production installation; or recommending grid-interconnect ancillary services dispatch service adjustment.

18. The apparatus of claim 16, wherein the apparatus is remote from the plurality of electrolyzers.

* * * * *